(12) United States Patent
Cheung et al.

(10) Patent No.: US 7,872,056 B2
(45) Date of Patent: *Jan. 18, 2011

(54) POLYMER BLENDS OF BIODEGRADABLE OR BIO-BASED AND SYNTHETIC POLYMERS AND FOAMS THEREOF

(75) Inventors: Yunwa Wilson Cheung, Pittsford, NY (US); David V. Dobreski, Canandaigua, NY (US); Richard Turner, Canandaigua, NY (US); Mark Wheeler, Clifton Springs, NY (US); Y. Paul Handa, Pittsford, NY (US)

(73) Assignee: Pactiv Corporation, Lake Forest, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/364,038

(22) Filed: Feb. 2, 2009

(65) Prior Publication Data

US 2009/0123728 A1    May 14, 2009

Related U.S. Application Data

(63) Continuation of application No. 12/048,467, filed on Mar. 14, 2008, which is a continuation-in-part of application No. 11/955,034, filed on Dec. 12, 2007.

(60) Provisional application No. 60/869,932, filed on Dec. 14, 2006.

(51) Int. Cl.
*C08L 25/00* (2006.01)
*C08J 9/12* (2006.01)

(52) U.S. Cl. .................. 521/134; 521/139; 521/140; 521/144; 521/145; 521/146; 521/149; 525/190; 525/411; 525/419

(58) Field of Classification Search ........... 521/50–189; 525/190, 411, 419
See application file for complete search history.

(56) References Cited

U.S. PATENT DOCUMENTS

| | | |
|---|---|---|
| 2,816,827 A | 12/1957 | Roth |
| 2,861,898 A | 11/1958 | Platzer |
| 2,911,382 A | 11/1959 | Barkhuff et al. |
| 2,912,279 A | 11/1959 | Lyon |
| 2,983,962 A | 5/1961 | Merz et al. |
| 3,085,073 A | 4/1963 | Lintner et al. |
| 3,089,857 A | 5/1963 | Pottenger et al. |
| 3,281,259 A | 10/1966 | Lux et al. |
| 3,290,198 A | 12/1966 | Lux et al. |
| 3,358,060 A | 12/1967 | Ohsol |
| 3,358,073 A | 12/1967 | Gamble |
| 3,379,799 A | 4/1968 | Goldman |
| 3,407,151 A | 10/1968 | Overchashier |
| 3,409,199 A * | 11/1968 | Connie Lake ............... 229/407 |
| 3,577,360 A | 5/1971 | Immel |
| 3,644,230 A | 2/1972 | Cronin |
| 3,670,916 A * | 6/1972 | Alpert ...................... 220/23.87 |
| 3,759,641 A | 9/1973 | Immel |
| 3,855,377 A | 12/1974 | Ubelhart et al. |
| 3,864,444 A | 2/1975 | Johnson |
| 3,900,433 A | 8/1975 | Taub et al. |
| 3,914,191 A | 10/1975 | Scott |
| 3,929,686 A | 12/1975 | Stevenson, et al. |
| 3,961,000 A | 6/1976 | Ropiequet |
| 3,962,154 A | 6/1976 | Egli |
| 3,976,605 A | 8/1976 | Matsunaga et al. |
| 4,009,976 A | 3/1977 | Johnson |
| 4,033,910 A | 7/1977 | Papa |
| 4,042,658 A | 8/1977 | Collins |
| 4,098,941 A | 7/1978 | Johnson |
| 4,104,440 A | 8/1978 | Collins |
| 4,214,054 A | 7/1980 | Watanabe et al. |
| 4,272,469 A | 6/1981 | Smith |
| 4,323,528 A | 4/1982 | Collins |
| 4,557,881 A | 12/1985 | Rabotski |
| 4,695,595 A | 9/1987 | Blount |
| 4,769,396 A | 9/1988 | Blount |
| 4,894,395 A | 1/1990 | Park |
| 4,916,166 A | 4/1990 | Suh et al. |
| 4,943,459 A * | 7/1990 | Nedzu ...................... 428/36.5 |

(Continued)

FOREIGN PATENT DOCUMENTS

DE    4230097    5/1994

(Continued)

OTHER PUBLICATIONS

Cereplast unveils breakthrough bio-based foamable resin, Jun. 22, 2009, www.plastemart.com.*

(Continued)

*Primary Examiner*—Irina S Zemel
(74) *Attorney, Agent, or Firm*—Baker Botts LLP

(57) ABSTRACT

The present invention relates to compositions comprising blends of alkenyl aromatic polymers such as styrenic polymers (i.e. PS and HIPS) and bio-based or biodegradable polymers (i.e. PLA, PGA, PHA, PBS, PCL) compatibilized with styrene-based copolymers (i.e. styrene-ethylene-butylene-styrene (SEBS) block copolymers, maleated SEBS, styrene-maleic anhydride (SMA) copolymer, styrene-methyl methacrylate (SMMA) copolymer or a mixture of two or more styrene-based copolymers such as SEBS and SMA. These novel compositions can be extruded and thermoformed to produce very low density food service and consumer foam articles such as plates, hinged lid containers, trays, bowls, and egg cartons with good mechanical properties.

18 Claims, 6 Drawing Sheets

U.S. PATENT DOCUMENTS

| | | | |
|---|---|---|---|
| 4,960,804 A | 10/1990 | Doerge | |
| 4,997,858 A | 3/1991 | Jourquin et al. | |
| 5,059,376 A | 10/1991 | Pontiff et al. | |
| 5,064,872 A | 11/1991 | Monstrey et al. | |
| 5,106,880 A | 4/1992 | Miller et al. | |
| 5,110,838 A | 5/1992 | Tokiwa et al. | |
| 5,116,880 A | 5/1992 | Tokiwa et al. | |
| 5,120,481 A | 6/1992 | Brackman et al. | |
| 5,134,171 A * | 7/1992 | Hammel et al. | 521/98 |
| 5,149,473 A | 9/1992 | LeDuc | |
| 5,166,182 A | 11/1992 | Blanpied | |
| 5,210,108 A | 5/1993 | Spinu et al. | |
| 5,216,050 A | 6/1993 | Sinclair | |
| 5,225,490 A | 7/1993 | Tokiwa et al. | |
| 5,227,408 A | 7/1993 | Hanna et al. | |
| 5,242,494 A | 9/1993 | Callaghan et al. | |
| 5,252,642 A | 10/1993 | Sinclair et al. | |
| 5,283,003 A | 2/1994 | Chen | |
| 5,308,528 A | 5/1994 | Desbiendras et al. | |
| 5,336,696 A | 8/1994 | Ashida | |
| 5,348,983 A | 9/1994 | Sterzel | |
| 5,378,792 A | 1/1995 | Sterzel | |
| 5,391,335 A | 2/1995 | Sakamoto et al. | |
| 5,422,053 A | 6/1995 | Sterzel | |
| 5,437,924 A | 8/1995 | Decker et al. | |
| 5,439,947 A | 8/1995 | Bartlett et al. | |
| 5,447,962 A | 9/1995 | Ajioka et al. | |
| 5,478,494 A | 12/1995 | Lee et al. | |
| 5,532,284 A | 7/1996 | Bartlett et al. | |
| 5,563,180 A | 10/1996 | Skowronski et al. | |
| 5,565,497 A | 10/1996 | Godbey et al. | |
| 5,699,946 A | 12/1997 | Hashimoto et al. | |
| 5,736,586 A | 4/1998 | Bastioli et al. | |
| 5,750,584 A | 5/1998 | Knaus | |
| 5,759,569 A | 6/1998 | Hird et al. | |
| 5,763,518 A | 6/1998 | Gnatowski et al. | |
| 5,780,521 A | 7/1998 | Shmidt et al. | |
| 5,786,401 A | 7/1998 | Inagaki et al. | |
| 5,853,848 A | 12/1998 | Fisk | |
| 5,912,279 A | 6/1999 | Hammel et al. | |
| 5,922,348 A | 7/1999 | Wegner | |
| 5,965,231 A | 10/1999 | Rotermund et al. | |
| 6,080,798 A | 6/2000 | Handa et al. | |
| 6,136,875 A | 10/2000 | Wu et al. | |
| 6,184,261 B1 | 2/2001 | Biby | |
| 6,310,112 B1 | 10/2001 | Vo et al. | |
| 6,315,932 B1 | 11/2001 | Fujiwara et al. | |
| 6,355,341 B1 | 3/2002 | Chaudhary et al. | |
| 6,355,701 B1 | 3/2002 | Soukup et al. | |
| 6,476,080 B2 | 11/2002 | Duffy et al. | |
| 6,521,675 B1 | 2/2003 | Wu et al. | |
| 6,526,764 B1 | 3/2003 | Singh et al. | |
| 6,569,912 B1 | 5/2003 | Oohara et al. | |
| 6,599,946 B2 | 7/2003 | Duffy et al. | |
| 6,626,746 B2 | 9/2003 | Mayr et al. | |
| 6,696,504 B1 | 2/2004 | Hayashi et al. | |
| 6,710,135 B2 | 3/2004 | Tan et al. | |
| 6,740,731 B2 | 5/2004 | Bigg et al. | |
| 6,753,357 B2 | 6/2004 | Kalinowski et al. | |
| 6,762,212 B2 | 7/2004 | Oohara et al. | |
| 6,841,581 B2 | 1/2005 | Hayashi et al. | |
| 7,045,556 B2 | 5/2006 | Handa et al. | |
| 7,166,248 B2 | 1/2007 | Francis et al. | |
| 7,358,282 B2 | 4/2008 | Krueger et al. | |
| 2002/0198273 A1 | 12/2002 | Nyberg et al. | |
| 2003/0078312 A1 | 4/2003 | Hibino et al. | |
| 2003/0114549 A1 | 6/2003 | Kalinowski et al. | |
| 2004/0006149 A1 | 1/2004 | Handa et al. | |
| 2004/0024077 A1 | 2/2004 | Braun et al. | |
| 2004/0132844 A1 | 7/2004 | Francis et al. | |
| 2005/0131094 A1 | 6/2005 | Kalinowski et al. | |
| 2005/0154114 A1 | 7/2005 | Hale | |
| 2006/0047009 A1 | 3/2006 | Handa et al. | |
| 2006/0052464 A1 | 3/2006 | Handa et al. | |
| 2006/0052466 A1 | 3/2006 | Handa et al. | |
| 2006/0062465 A1 | 3/2006 | Li et al. | |
| 2006/0091576 A1 | 5/2006 | Takase et al. | |
| 2006/0167122 A1 | 7/2006 | Haraguchi et al. | |
| 2007/0004813 A1 | 1/2007 | Shelby et al. | |
| 2008/0146686 A1 | 6/2008 | Handa | |
| 2009/0012194 A1 | 1/2009 | Okuda et al. | |
| 2009/0234035 A1 | 9/2009 | Cheung et al. | |

FOREIGN PATENT DOCUMENTS

| | | | |
|---|---|---|---|
| DE | 19824134 | 12/1999 | |
| EP | 0493110 | 7/1992 | |
| EP | 1975195 | 10/2008 | |
| FR | 2264840 | 10/1975 | |
| JP | 06041344 | 2/1994 | |
| JP | 2006-328318 | 12/2006 | |
| JP | 2006-348060 | 12/2006 | |
| JP | 2006328318 | 12/2006 | |
| KR | 185251 | 5/1999 | |
| WO | WO91/01396 | 9/1991 | |
| WO | WO95/02000 | 1/1995 | |
| WO | WO2004/005382 | 1/2004 | |
| WO | WO2007083705 | * | 7/2007 |
| WO | WO 2007083705 | 7/2007 | |
| WO | WO2008/098888 | 8/2008 | |

OTHER PUBLICATIONS

U.S. Appl. No. 12/048,467, filed Mar. 14, 2008, Cheung et al.

Mohamed et al., "Polycaprolactone/polystyrene bioblends characterized by thermogravimetry, modulated differential scanning calorimetry and infrared photoacoustic spectroscopy," Polymer Degradation and Stability, vol. 92, Issue 7, Jul. 2007, pp. 1177-1185.

de Carvalho et al., "Polyhydroxybutyrate/acrylonitrile-g-(ethylene-co-propylene-co-diene)-g-styrene blends: Their morphology and thermal and mechanical behavior," Journal of Applied Polymer Science, vol. 110 Issue 2, pp. 880-889, Jul. 10, 2008.

U.S. Appl. No. 12/048,467, Mar. 14, 2008.

U.S. Appl. No. 11/955,034, Dec. 12, 2007.

Co-pending U.S. Appl. No. 11/955,034, Non-final Office Action-Dec. 14, 2009.

Co-pending U.S. Appl No. 11/955,034, Non-final Office Action Response-Sep. 14, 2009.

Co-pending U.S. Appl. No. 11/955,034, Non-final Office action-Apr. 14, 2009.

U.S. Appl. No. 11/955,034, Final Office Action Response-Mar. 11, 2009.

U.S. Appl. No. 11/955,034, Final Office Action-Dec. 11, 2008.

U.S. Appl. No. 11/955,034, Non-final Office Action Response-Sep. 5, 2008.

U.S. Appl. No. 11/955,034, Non-final Office Action-Jun. 24, 2008.

Flieger M et al., "Biodegradable Plastics from Renewable Sources, "Folia Microbiol. (2003); 48(1):27-44.

Nangeroni, J. (Oct. 2007). *Foam Extrusion and Thermoforming of NatureWorks® Polymer*. Presented at Polymer Foams 2007, organized by Applied Market Information LLC, Newark, NJ.

Narayan Ramani, "Biobased & Biodegradable Plastics 101," Chemical Engineering & Materials Science.

U.S. Appl. No. 11/677,371, Feb. 21, 2007.

U.S. Appl. No. 11/955,034, Dec. 12, 2007.

U.S. Appl. No. 10/934,832, Sep. 3, 2004.

U.S. Appl. No. 11/016,312, Dec. 17, 2004.

U.S. Appl. No. 11/122,158, May 3, 2005.

U.S. Appl. No. 11/151,814, Jun. 13, 2005.

U.S. Appl. No. 11/367,652, Mar. 3, 2006.

U.S. Appl. No. 12/048,467, Mar. 14, 2008.

U.S. Appl. No. 11/680,170, Feb. 28, 2007.

U.S. Appl. No. 11/677,371, Response to Non-Final Rejection mailed on Jan. 26, 2010 filed on Apr. 26, 2010.

U.S. Appl. No., Non-Final Rejection mailed on Jan. 26, 2010.

U.S. Appl. No. 11/677,371, Response to Non-Final Rejection mailed on Apr. 30, 2009 filed Jul. 30, 2009.
U.S. Appl. No. 11/677,371, Non-Final Rejection mailed on Apr. 30, 2009.
U.S. Appl. No. 11/677,371, Request for Continued Examination filed on Mar. 24, 2009.
U.S. Appl. No. 11/677,371, Final Rejection mailed on Dec. 24, 2008.
U.S. Appl. No. 11/677,371, Response to Non-Final Rejection mailed on Jun. 24, 2008 filed Sep. 4, 2008.
U.S. Appl. No. 11/677,371, Non-Final Rejection mailed on Jun. 24, 2008.
U.S. Appl. No. 11/955,034, Response to Non-Final Rejection mailed on Dec. 14, 2009 filed on Apr. 14, 2010.
U.S. Appl. No. 11/955,034, Non-Final Rejection mailed on Dec. 14, 2009.
U.S. Appl. No. 11/955,034, Response to Non-Final Rejection mailed on Apr. 14, 2009 filed Sep. 14, 2009.
U.S. Appl. No. 11/955,034, Non-Final Rejection mailed on Apr. 14, 2009.
U.S. Appl. No. 11/955,034, Request for Continued Examination filed on Mar. 11, 2009.
U.S. Appl. No. 11/955,034, Final Rejection mailed on Dec. 11, 2008.
U.S. Appl. No. 11/955,034, Response to Non-Final Rejection mailed on Jun. 24, 2008 filed Sep. 5, 2008.
U.S. Appl. No. 11/955,034, Non-Final Rejection mailed on Jun. 24, 2008.
U.S. Appl. No. 10/934,832, Notice of Allowance mailed Sep. 12, 2007.
U.S. Appl. No. 10/934,832, Respnse to Non-Final Rejection mailed on Apr. 17, 2007 filed on Jul. 17, 2007.
U.S. Appl. No. 10/934,832, Non-Final Rejection mailed on Apr. 17, 2007.
U.S. Appl. 10/934,832, Request for Continued Examination filed on Feb. 6, 2007.
U.S. Appl. No. 10/934,832, Final Rejection mailed on Aug. 10, 2006.
U.S. Appl. No. 10/934,832, Response to Non-Final Rejection mailed on Mar. 3, 2006 filed on Jun. 5, 2006.
U.S. Appl. No. 10/934,832, Non-Final Rejection mailed on Mar. 3, 2006.
U.S. Appl. No. 10/934,832, Response to Non-Final Rejection mailed on Sep. 28, 2005 filed on Dec. 12, 2005.
U.S. Appl. No.10/934,832, Non-Final Rejection mailed on Sep. 28, 2005.
U.S. Appl. No. 11/016,312, Certificate of Correction - Post Issue mailed on May 6, 2008.
U.S. Appl. No. 11/016,312, Request for Certificate of Correction - Post Issue filed on Feb. 6, 2008.
U.S. Appl. No. 11/016,312, Amendment after Notice of Allowance filed Oct. 30, 2007.
U.S. Appl. No. 11/016,312, Notice of Allowance mailed Sep. 14, 2007.
U.S. Appl. No. 11/016,312, Response to Non-Final Rejection mailed on Mar. 28, 2007 filed on Jul. 30, 2007.
U.S. Appl. No. 11/016,312, Non-Final Rejection mailed on Mar. 28, 2007.
U.S. Appl. No. 11/016,312, Response to Notice of Non-Compliant or Non-Responsive Amendment mailed on Dec. 5, 2006 filed on Jan. 2, 2007.
U.S. Appl. No. 11/016,312, Notice of Non-Compliant or Non-Responsive Amendment mailed on Dec. 5, 2006.
U.S. Appl. No. 11/016,312, Amendment After Final filed on Sep. 28, 2006.
U.S. Appl. No. 11/016,312, Request for Continued Examination filed on Sep. 15, 2006.
U.S. Appl. No. 11/016,312, Amendment After Final filed on Jun. 16, 2006.
U.S. Appl. No. 11/016,312, Final Rejection mailed on Mar. 16, 2006.
U.S. Appl. No. 11/016,312, Response to Non-Final Rejection mailed on Sep. 28, 2005 filed on Dec. 29, 2005.
U.S. Appl. No. 11/016,312, Non-Final Rejection mailed on Sep. 28, 2005.
U.S. Appl. No. 11/122,158, Non-Final Rejection mailed on Oct. 10, 2007.
U.S. Appl. No. 11/151,814, Non-Final Rejection mailed on Jan. 4, 2008.
U.S. Appl. No. 11/367,652, Non-Final Rejection mailed on Mar. 13, 2009.
U.S. Appl. No. 11/680,170, Response to Non-Final Rejection mailed on Dec. 14, 2009 filed on Apr. 14, 2010.
U.S. Appl. No. 11/680,170, Non-Final Rejection mailed on Dec. 14, 2009.
Cellular Materials, Encyclopedia of Polymer Science and Technology, J. Wisley and Sons, Article online, copyright 1999-2005.
International Search Report for PCT/US2007/062492, filed Feb. 21, 2007, International Searching Authority, Alexandria, Virginia, Sep. 18, 2008.
U.S. Appl. No. 11/955,034, Final Rejection mailed on Jul. 21, 2010.
U.S. Appl. No.11/680,170, Response to Restriction Election Requirement mailed on Jun. 24, 2010 filed on Jul. 21, 2010.
U.S. Appl. No. 11/680,170, Restriction Election Requirement mailed on Jun. 24, 2010.
U.S. Appl. No. 12/048,467, Non-Final Rejection mailed Jul. 23, 2010.
U.S. Appl. No. 11/677,371, Final Rejection mailed Jul. 21, 2010.

* cited by examiner

| Sample ID | % PLA (NatureWorks 2002D) | % PS | Compatibilizer Type | % Compatibilizer |
|---|---|---|---|---|
| 1 | 35 | 62.5 | NAS 30 | 2.5 |
| 2 | 35 | 60 | NAS 30 | 5 |
| 3 | 35 | 55 | NAS 30 | 10 |
| 4 | 35 | 65 | n/a | 0 |
| 5 | 35 | 62 | Zylar 631 | 3 |
| 6 | 35 | 62 | FG1901 | 3 |
| 7 | 35 | 60 | Zylar 631 | 5 |
| 8 | 35 | 55 | Zylar 631 | 10 |
| 9 | 50 | 47 | NAS30 | 3 |
| 10 | 50 | 47 | Zylar 631 | 3 |
| 11 | 50 | 47 | FG1901X | 3 |
| 12 | 50 | 47 | NAS-21 | 3 |
| 13 | 35 | 64 | FG1901X | 1 |
| 14 | 35 | 63 | FG1901X | 2 |
| 15 | 50 | 45 | FG1901X | 5 |
| 16 | 50 | 43 | FG1901X | 7 |
| 17 | 50 | 49 | FG1901X | 1 |
| 18 | 50 | 48 | FG1901X | 2 |

FIG. 3

| Sample Descriptor | PLA % | PS% | Compatibilizer Type | % Compatibilizer | % Open Cell | Density lb/ft³ | Density g/cc | Flex Modulus (psi) MD | Flex Modulus (psi) TD |
|---|---|---|---|---|---|---|---|---|---|
| control | 0 | 100 | N/A | N/A | N/A | 6.59 | 0.11 | N/A | N/A |
| 1 | 35 | 62.5 | NAS 30 | 2.5 | 12.2 | 6.19 | 0.10 | 14574 | 19760 |
| 2 | 35 | 60 | NAS 30 | 5 | 15.7 | 6.64 | 0.11 | 16964 | 24601 |
| 2 (w/2% talc) | 35 | 60 | NAS 30 | 5 | 68.7 | 5.57 | 0.09 | 9235 | 31402 |
| 3 | 35 | 55 | NAS 30 | 10 | 44.8 | 6.03 | 0.10 | 15963 | 13780 |
| 4 | 35 | 65 | N/A | 0 | N/A | N/A | N/A | N/A | N/A |
| 5 | 35 | 62 | Zylar 631 | 3 | N/A | N/A | N/A | N/A | N/A |
| 6 | 35 | 62 | FG1901 | 3 | 5.8 | 4.66 | 0.07 | 11935 | 23436 |
| 6 (w/2% talc) | 35 | 62 | FG1901 | 3 | 14.3 | 4.59 | 0.07 | 13461 | 12067 |
| 7 | 35 | 60 | Zylar 631 | 5 | N/A | N/A | N/A | N/A | N/A |
| 8 | 35 | 55 | Zylar 631 | 10 | N/A | N/A | N/A | N/A | N/A |
| 9 | 50 | 47 | NAS30 | 3 | N/A | N/A | N/A | N/A | N/A |
| 10 | 50 | 47 | Zylar 631 | 3 | N/A | N/A | N/A | N/A | N/A |
| 11 | 50 | 47 | FG1901 | 3 | 37.0 | 4.00 | 0.06 | 6185 | 10570 |
| 12 | 50 | 47 | NAS-21 | 3 | N/A | N/A | N/A | N/A | N/A |
| 13 | 35 | 64 | FG1901 | 1 | 9.5 | 5.87 | 0.09 | 10025 | 14507 |
| 14 | 35 | 63 | FG1901 | 2 | 12.3 | 5.84 | 0.09 | 13461 | 17086 |
| 15 | 50 | 45 | FG1901 | 5 | 24.2 | 4.21 | 0.07 | 5367 | 10881 |
| 15 (w/o drying) | 50 | 45 | FG1901 | 5 | 15.4 | 7.22 | 0.12 | N/A | N/A |
| 16 | 50 | 43 | FG1901 | 7 | N/A | N/A | N/A | N/A | N/A |
| 17 | 50 | 49 | FG1901 | 1 | 47.9 | 5.89 | 0.09 | N/A | N/A |
| 18 | 50 | 48 | FG1901 | 2 | 30.5 | 4.33 | 0.07 | N/A | N/A |
| 19 | 50 | 45 | FG1901 | 5 | N/A | 9.88 | 0.16 | N/A | N/A |
| 20 | 50 | 45 | FG1901 | 5 | N/A | 4.07 | 0.07 | N/A | N/A |

FIG. 4

| Sample ID | %PLA | %PS | %Kraton 1901X | Density (lb/ft³) | Open Cell % | Basis Weight g./100 in² | Gauge in. | Flex Modulus |
|---|---|---|---|---|---|---|---|---|
| 21 | 51 | 44 | 5 | 6.83 | 20.1 | 7.0 g. | .039 | N/A |
| 22 | 51 | 44 | 5 | 6.60 | 51.2 | 7.8 g. | .045 | N/A |
| 23 | 55 | 40 | 5 | 6.49 | 66.0 | 8.0 g. | .047 | N/A |

FIG. 5

| Sample ID | % PLA | % PS | % Kraton 1901X | % Iso-Pentane | % $CO_2$ | Output (lbs/hr) | Secondary Extruder Melt Temp (°F) |
|---|---|---|---|---|---|---|---|
| 21 | 51 | 44 | 5 | 3.80 | 0.65 | 138.00 | 286 |
| 22 | 51 | 44 | 5 | 3.35 | 1.00 | 150.00 | 286 |
| 23 | 55 | 40 | 5 | 3.13 | 1.00 | 160.00 | 291 |

FIG. 6

| Sample ID | % PLA | % PS | % Kraton 1901 | % Kraton 1652 | % Dylark 232 | % Plexiglass 684-IAXP | Melt Temp (°F) | % Iso-pentane | % $CO_2$ | Basis Wt. (g/100 in²) | Gauge (in.) | Density (lb/ft³) | % Open Cell | MD Flex Modulus (psi) | TD Flex Modulus (psi) |
|---|---|---|---|---|---|---|---|---|---|---|---|---|---|---|---|
| Control | 0 | 100 | 0 | 0 | 0 | 0 | 297 | 3.6 | 0.72 | 7.1 | 0.045 | 6.0 | 4 | 31866 | 24036 |
| 24 | 51 | 46 | 1 | 0 | 2 | 0 | 286 | 4.01 | 0.36 | 7.0 | 0.045 | 5.9 | 7 | 19950 | 17127 |
| 25 | 51 | 46 | 1 | 0 | 2 | 0 | 286 | 3.83 | 0.36 | 9.0 | 0.045 | 7.6 | 9 | 21537 | 27397 |
| 26 | 51 | 46 | 1 | 0 | 2 | 0 | 285 | 4.00 | 0.26 | 8.0 | 0.045 | 6.8 | 18 | 22362 | 27213 |
| 27 | 51 | 46 | 0 | 1 | 2 | 0 | 282 | 4.14 | 0.27 | 8.0 | 0.045 | 6.8 | 6 | 18056 | 23528 |
| 28 | 51 | 46 | 0 | 1 | 0 | 2 | 281 | 4.18 | 0.27 | 8.0 | 0.045 | 6.8 | 12 | 17290 | 17770 |
| 29 | 51 | 46 | 1 | 0 | 0 | 2 | 284 | 4.17 | 0.30 | 8.0 | 0.045 | 6.8 | 8 | 14973 | 21514 |

FIG. 7

POLYMER BLENDS OF BIODEGRADABLE OR BIO-BASED AND SYNTHETIC POLYMERS AND FOAMS THEREOF

CROSS-REFERENCE TO RELATED APPLICATIONS

This application is a continuation of U.S. patent application Ser. No. 12/048,467, filed Mar. 14, 2008, which is a continuation-in-part of U.S. patent application Ser. No. 11/955,034, filed Dec. 12, 2007, which claims priority to a U.S. Provisional Application 60/869,932, filed Dec. 14, 2006, each of which is incorporated by reference in its entirety herein.

FIELD OF INVENTION

The present invention relates generally to polymer blend compositions comprising a biodegradable or bio-based polymer, processes of making the same and applications of the same. Particularly, the present invention relates to thermoplastic foamable blends of an alkenyl aromatic polymer with a biodegradable or bio-based polymer and one or more blend compatibilizers, processes of making the same, and applications of the same.

BACKGROUND OF THE INVENTION

In general, synthetic resin has been applied to a variety of industrial fields because it exhibits excellent mass productivity, moldability and durability. In particular, synthetic resin foam is light-weight and exhibits increased cushioning properties and is widely commercialized in various forms such as a protective casing for a fragile article such as a glass product, a cushioning material for packing, a tableware, consumer packaging products, food packaging products, a heat insulation material, a sound insulation material and the like.

Modern processing and packaging technology allows a wide range of liquid and solid goods to be stored, packaged, and shipped in synthetic polymeric packaging materials while being protected from harmful elements, such as gases, moisture, light, microorganisms, vermin, physical shock, crushing forces, vibration, leaking, or spilling. However, many of these materials have little, if any, functional degradability.

Due to widespread environmental concerns, there has been significant pressure on companies to develop more environmentally friendly materials. Some groups have favored the use of products such as paper or other products made from wood pulp. However, the production of paper products generally requires a tremendous amount of energy and can result in unnecessary or undesirable waste. A strong need to find new, more sustainable or renewable materials that meet necessary performance standards remains.

In view of the foregoing, much attention has been recently directed to biodegradable resins and a great effort has been made to develop biodegradable resins that can replace conventional synthetic resins. Biodegradable polymers are an alternative to petroleum-based polymers. Some biodegradable polymers degrade in only a few weeks, while the degradation of others takes several months. Biodegradable polymers are degraded by the action of naturally occurring microorganisms such as bacteria, fungi and algae. Biodegradable polymers can be made from natural polymers such as starch, sugar, or cellulose, or can be petroleum based synthetics.

Additionally, attention has been directed to making compostable polymer compositions as well as polymer compositions that are made of a renewable or sustainable material. Attention has been directed to production of polymers generated from renewable natural sources, which are often biodegradable and nontoxic. These renewable polymers can be produced from biological systems such as microorganisms, plants, and animals or can be chemically synthesized from biological materials such as sugars, starch, natural fats or oils, etc.

As a result, increased attention has been directed to processing natural polymers. However, these natural polymers are significantly more expensive to produce than their synthetic counterparts and do not exhibit the same physical properties, such as foamability, strength and heat resistance.

In particular, there have been many attempts to process starch, a natural polymer that is relatively inexpensive and is a renewable material, into a thermoplastic form to allow starch based polymers to be used in the place of non-degradable synthetic polymers. Starch has been incorporated into multi-component compositions in various forms, including as filler and binder.

Although many have attempted for years to perfect a starch composition that would yield an environmentally sound material while, at the same time, being economical to make, such a combination has not yet been achieved. Additionally, starch based polymeric compounds and products made therefrom have not met the physical properties of other non-biodegradable materials such as polystyrene.

Development of foamable blends comprising bio-based or biodegradable polymer has proven particularly difficult. Techniques of foaming synthetic resin which have been carried out in the art include a method of producing foamed beads including the steps of charging styrene beads in a forming mold and adding water vapor thereto, followed by a decrease in pressure, a method of foaming synthetic resin by charging an extruder with, for example, styrene resin together with a foaming agent such as an organic solvent or the like to foam the resin due to a pressure reducing action occurring when the resin is extruded, and the like.

Alternatively, polymer foams are commonly made using a continuous process where a blowing agent laden molten resin is extruded under pressure through an appropriate die into a lower pressure atmosphere. A batch or staged process can be used, where small polymer beads (also called particles or pellets) are impregnated with blowing agent and then expanded by heating rapidly to a temperature near or above the glass-transition or melting temperature of the polymer-blowing agent system, or subjected to an external compressive stress at a temperature up to the glass-transition or melting temperature of the polymer-blowing agent system.

However, such conventional chemical foaming techniques for foaming synthetic resin as described above fail to satisfactorily foam biodegradable resin due to a relationship between a softening point or melting point of the resin and a foaming temperature of a foaming agent and the like. Thus, there are known many problems which are encountered with techniques of foaming biodegradable resin to a high expansion and forming the foamed resin.

Therefore, a need exists for a bio-based or partially-biodegradable polymer product that is strong, not prone to mold or pests, and can be readily and inexpensively made, and preferably can be foamed to replace polystyrene foam which is not readily biodegradable.

SUMMARY OF THE INVENTION

According to one aspect of the present invention, a bio-based or partially biodegradable thermoplastic foam structure is provided including at least one alkenyl aromatic polymer, at least one bio-based or biodegradable polymer, and at least one blend compatibilizer, the foam structure has an expansion ratio greater than 5. The at least one blend compatibilizer can be selected from: maleated styrene-ethylene-butene-styrene (SEBS), SEBS, styrene-maleic anhydride (SMA) copolymer, and styrene-methyl methacrylate (SMMA) copolymer. The foam structure can be an extruded sheet. The foam structure can include between about 45 to 80 percent by weight of at least one alkenyl aromatic polymer. The foam structure of claim can be a thermoformed article. The foam structure can include between about 20 to 55 weight percent of at least one bio-based or biodegradable polymer. The foam structure can include between about 0.1 to 15 weight percent of at least one blend compatibilizer. In one embodiment, the foam structure can include between about 1.0 to 10 weight percent of at least one blend compatibilizer. The at least one alkenyl aromatic polymer can be selected from: polystyrene, substituted polystyrene and copolymers thereof, and high-impact polystyrene and copolymers thereof. The at least one bio-based or biodegradable polymer can be selected from: aliphatic polyesters, polylactic acid and copolymers thereof, polyglycolic acid, polybutylene succinate or copolymers thereof, polycaprolactone, polyvinyl alcohol and copolymers thereof, aliphatic-aromatic copolyesters, polyhydroxyalkanoate and copolymers thereof, polysaccachrides, cellulosic polymers and soy-based polymers. The foam structure can have an expansion ratio of about 10. The foam structure can have an open cell content of from about 1 to about 30 percent. The foam structure can include two blend compatibilizers. The foam structure can include approximately 46 percent of the at least one alkenyl aromatic polymer, approximately 51 percent of the at least one bio-based or biodegradable polymer, approximately 1 percent of a first blend compatibilizer, and approximately 2 percent of a second blend compatibilizer, wherein the at least one alkenyl aromatic polymer is polystyrene and the at least one bio-based or biodegradable polymer is polylactic acid.

According to another aspect of the present invention, a bio-based or partially biodegradable thermoplastic foam structure is provided including at least one alkenyl aromatic polymer, at least one bio-based or biodegradable polymer, and at least two blend compatibilizers, at least one of which is selected from: maleated styrene-ethylene-butene-styrene, and styrene-methyl methacrylate copolymer, wherein the foam structure has an expansion ratio greater than 5. The foam structure can include about 10 to 90 weight percent of the at least one alkenyl aromatic polymer, about 10 to 90 weight percent of the bio-based or biodegradable polymer, and about 0.1 to 15 weight percent of the at least two blend compatibilizers, wherein the at least one alkenyl aromatic polymer is polystyrene and the at least one bio-based or biodegradable polymer is polylactic acid. The foam structure can have an expansion ratio of about 10. The foam structure can have an open cell content of from about 1 to about 30 percent. The foam structure can include approximately 46 percent polystyrene, approximately 51 percent polylactic acid, approximately 1 percent of a first blend compatibilizer, and approximately 2 percent of a second blend compatibilizer.

According to another aspect of the present invention, a bio-based or partially biodegradable thermoplastic foam structure is provided included polystyrene, polylactic acid, styrene-maleic anhydride, maleated styrene-ethylene-butene-styrene, wherein the foam structure has an expansion ratio greater than 5 and an open cell content of from about 1 to about 60 percent.

BRIEF DESCRIPTION OF THE DRAWINGS

FIG. 3 is a table showing the compositions of various blend samples prepared for testing according to an aspect of the present invention.

FIG. 4 is a table of the physical properties of various samples prepared according to an aspect of the present invention.

FIG. 5 is a table showing the compositions and test results of various blend samples prepared for testing according to an aspect of the present invention.

FIG. 6 is a table showing the processing conditions for the samples referred to in FIG. 5.

FIG. 7 is a table of the physical properties of various samples having dual blend compatibilizers and prepared according to an aspect of the present invention.

Figure 1:
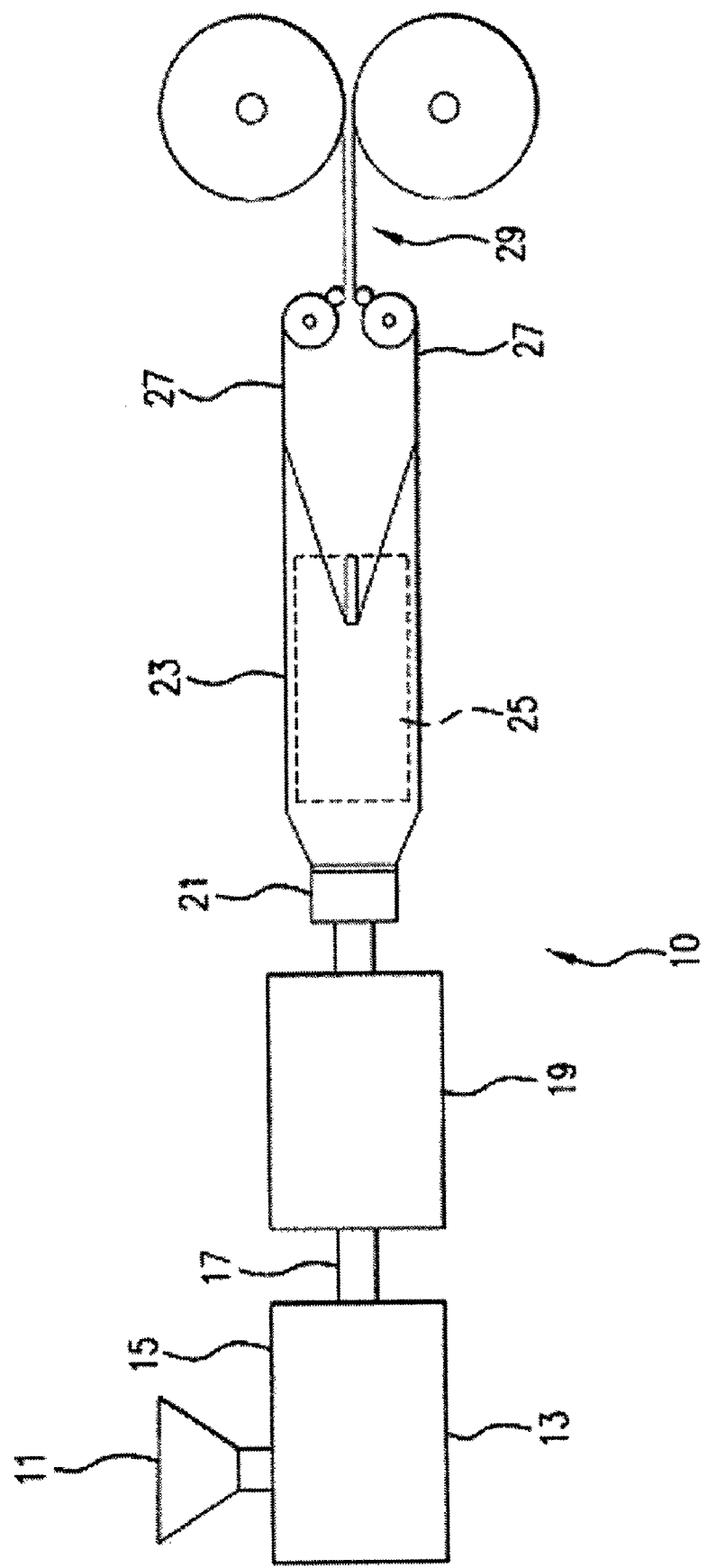
FIG. 1 is a schematic flow diagram of an overall sequence of operations involved in the manufacture of an extruded foam sheet according to one embodiment of the present invention.

While the invention is capable of various modifications and alternative forms, specific embodiments thereof have been shown by way of the process diagrams and testing data shown in FIGS. 1-7, and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

DETAILED DESCRIPTION OF THE INVENTION

Reference will now be made in detail to the various aspects of the present invention. The method and corresponding steps of the invention will be described in conjunction with the detailed description of the compositions.

The methods and compositions presented herein can be used for the manufacture of a composition including a bio-based or biodegradable component. The present invention is particularly suited manufacturing foam beads, sheets, boards or planks.

Bio-based polymers are sustainable or partially sustainable natural or synthetic polymers. Bio-based polymers are organic materials in which the carbon comes from non-fossil biological sources. Bio-based materials may contain 100 percent new carbon or may be mixed physically, chemically, or biologically, with fossil based carbon.

Biodegradable polymers are polymers that are degradable as a result of the action of naturally occurring microorganisms, such as bacteria, fungi, and algae. Biodegradable polymers can include compostable polymers.

As embodied herein, a bio-based or partially-biodegradable thermoplastic composition is achieved by blending at least one alkenyl aromatic polymer, at least one bio-based or biodegradable polymer, and at least one blend compatibilizer.

As embodied herein, the alkenyl aromatic polymer component of the blend composition is preferably a styrenic polymer such as polystyrene, substituted polystyrene, high-impact polystyrene, or copolymers thereof. Styrenic polymers are preferred due to their foamability and good physical properties which make them excellent materials for creating containers and packages. However, styrenic polymers are not generally regarded as renewable or sustainable materials. Thus, it is advantageous to blend an alkenyl aromatic polymer such as a styrenic polymer which has excellent physical properties, with a bio-based or biodegradable polymer to increase the overall sustainability or degradability of the composition.

If desired, more than one alkenyl aromatic polymer can be blended into the composition. For example, a combination of polystyrene and high-impact polystyrene or substituted polystyrene and a copolymer of polystyrene can be blended as the alkenyl aromatic polymer component of the blend composition.

A variety of suitable bio-based or biodegradable polymers can be blended with the alkenyl aromatic polymer to increase the sustainability or degradability of the overall composition. As embodied herein, the bio-based or biodegradable polymer can be an aliphatic polyester such as polylactic acid or copolymers thereof, polyglycolic acid or copolymers thereof, or polybutylene succinate or copolymers thereof, polycaprolactone, polyvinyl alcohol. Moreover, the bio-based or biodegradable polymer can be polyhydroxyalkanoates (PHA) synthesized by bacteria as intracellular carbon and energy storage granules. Examples of PHA families of biopolymers include poly-3-hydroxybutylate (PHB) or copolyesters of 3-hydroxybutylate and 3-hydroxyhexanoate. Alternatively, the bio-based or biodegradable polymer can be an aliphatic-aromatic copolyester such as EcoFlex®, sold by BASF or Biomax® from DuPont. Other bio-based or biodegradable polymers that can be used in the blend include polysaccharides, cellulosic polymers, and soy-based polymers.

The bio-based or biodegradable polymers used in the blend composition can be any suitable bio-based or biodegradable polymers. One exemplary type of polymers are bio-based or biodegradable polymers with narrow molecular weight distributions, having linear structure and a melt index of from about 0.1 to about 20 (210° C./2.16 kg). A linear, narrow molecular weight distribution bio-based or biodegradable polymer is described in detail in the Foam Extrusion and Thermoforming presentation given by Jim Nangeroni, Ph.D., the entirety of which is incorporated herein by reference. Nangeroni, J. (2007, October). *Foam Extrusion and Thermoforming of NatureWorks® Bio-Polymer*. Presented at Polymer Foams 2007, organized by Applied Market Information LLC, Newark, N.J.

As embodied herein, the bio-based or biodegradable polymer component can include more than one bio-based or biodegradable polymer blended into the composition.

In accordance with a preferred aspect of the invention, the bio-based or partially-biodegradable thermoplastic composition is foamable. This is achieved by the addition of an appropriate blend compatibilizer or compatibilizers to the blend of an alkenyl aromatic polymer and a bio-based or biodegradable polymer can render the otherwise un-expandable blend foamable.

The alkenyl aromatic polymer and bio-based or biodegradable polymer blend can be compatibilized with styrene-based copolymers having functional groups that present specific interactions or are miscible or compatible with the bio-based or biodegradable polymer. Such blend compatibilizers include styrene-based copolymers containing hydroxyl groups, carboxylic acid and/or carboxylate groups, tertiary amino groups and or salts thereof and/or quaternary ammonium groups, sulfonic acid and/or sulphonate groups, vinyl pyrrolidone. For example, the blend compatibilizer can be styrene-ethylene-butylene-styrene (SEBS) block copolymers, maleated SEBS, styrene-maleic anhydride (SMA) copolymers, or styrene acrylate copolymers such styrene-methyl methacrylate (SMMA) copolymers. The blend can be compatibilized with a mixture of two or more styrene-based copolymers such as SEBS and SMA.

The bio-based or degradable composition can also include additives such as, for example, fillers, nano-fillers, colorants, light and heat stabilizers, anti-oxidants, acid scavengers, stability control agents, processing aids, extrusion aids, nucleating agents, and foaming additives.

In accordance with an aspect of the present invention, the blend composition can be foamed by any suitable process known in the art. For example, polymer foams are commonly made using a continuous process where a blowing agent laden molten resin is extruded under pressure through an appropriate die into a lower pressure atmosphere. Alternatively, a batch or staged process can be used, where small polymer beads (also called particles or pellets) are impregnated with blowing agent and then expanded by heating rapidly to a temperature near or above the glass-transition or melting temperature of the polymer-blowing agent system, or subjected to an external compressive stress at a temperature up to the glass-transition or melting temperature of the polymer-blowing agent system.

As embodied herein, the blend can include between about 10 to 90 percent by weight of the alkenyl aromatic polymer component. Preferably, the blend can include between about 45 to 80 percent by weight of the alkenyl aromatic polymer component.

The blend can include between about 10 to 90 percent by weight of the biodegradable or bio-based polymer component. Preferably, the blend can include between about 20 to 55 percent by weight of the bio-based or biodegradable polymer component.

The blend can include between about 0.10 to 15 percent by weight of the blend compatibilizer component. Preferably, the blend can include between about 1 to 10 percent by weight of the blend compatibilizer component.

In accordance with another aspect of the invention, the bio-based or partially-biodegradable compositions can be extruded and drawn into boards, sheets, or formed into beads. Furthermore, if desired, extruded sheets can be thermoformed to produce very low density foam articles such as plates, hinged lid containers, trays, bowls, and egg cartons.

The bio-based or partially-biodegradable composition can achieve a density of from about 0.020 to about 0.30 g/cm3.

It is desirable that the resulting structure have suitable physical characteristics, which will depend upon the intended use. Particularly, it is preferred that the structure formed of the bio-based or partially-biodegradable polymer composition have characteristics at least comparable to conventional synthetic polymers.

In accordance with an aspect of the invention, the bio-based or partially biodegradable composition is extruded and foamed. The foamed composition preferably has an open cell content of from about 1 to about 60 percent, more preferably an open cell content of from about 1 to about 30 percent, most preferably an open cell content of from about 1 to about 10 percent In order to process and compound the components to the blend, the biodegradable or bio-based polymer component can first be dried in a vacuum drier. The dried bio-based or biodegradable polymer component is then mixed with the alkenyl aromatic polymer component and the blend compatibilizer. The mixing of the alkenyl aromatic polymer component and the bio-based or biodegradable polymer component can be a dry blending in, for example, a batch mixer or a continuous feeding system prior to being introduced to an extruder.

As embodied herein, the blend composition can be compounded and extruded using a twin screw extruder to create blend pellets. The blend pellets are dried and mixed with a blowing agent in order to be foamed. The amount of blowing agent can be between about 1 to about 10 percent. An exemplary blowing agent suitable for foaming the compositions of the present invention, is iso-pentane. However, any suitable blowing agent as known in the art can be used.

Any of the variety of suitable extrusion system or other methods known in the art for dissolving blowing agent in polymers can be used in accordance with the present invention. One example of a suitable system and method includes, for example, a conventional two-extruder tandem system with each extruder having a single screw. Alternatively, a two-extruder tandem system in which the primary extruder is a twin screw and the secondary extruder is a single screw can be used for extruding the foam article of the present invention. A single extruder with proper cooling can also be employed in the present invention.

Figure 2:
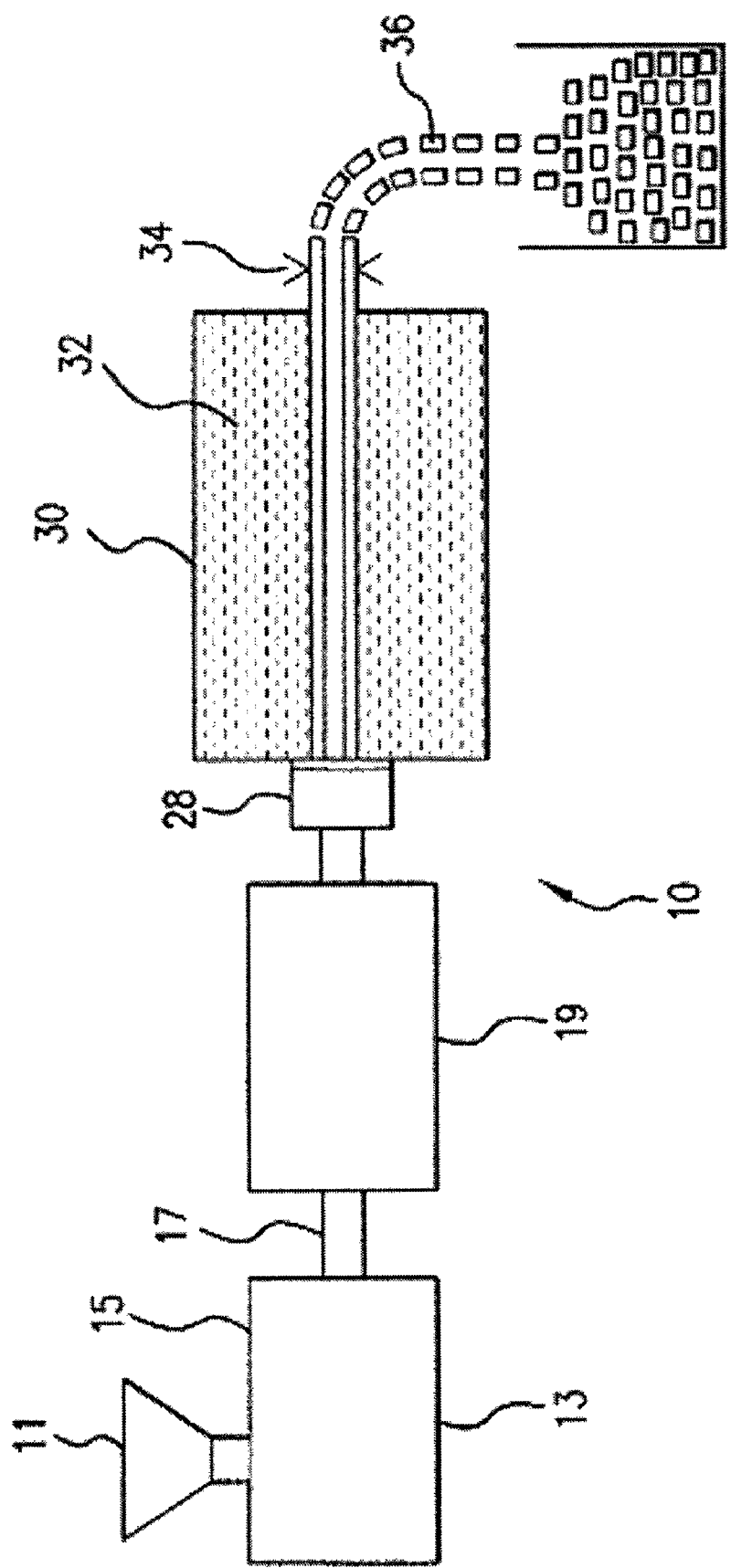
FIG. 2 is a schematic flow diagram of an overall sequence of operations involved in the manufacture of expandable beads according to one embodiment of the present invention.

According to one embodiment as applied to alkenyl aromatic polymers such as polystyrene, a two-extruder tandem system 10 can be used for extruding a foam article (e.g. a sheet) of the present invention as depicted in FIG. 1, or for making expandable beads as depicted in FIG. 2. Polymer resin pellets are mixed with one or more additives (e.g. a nucleating agent such as talc) to form a feed mixture which is fed continuously into a hopper 11 of a primary extruder 13. The feed mixture is conveyed forward by a helical screw within the barrel of the primary extruder as the feed components are mixed, compressed, heated, and melted prior to reaching the blowing agent-injection zone. The blowing agent is added at point 15. Thus, the blowing agent of the present invention is injected at a point beyond the feed zone where the polymer exists in the melt state. If desired, the blowing agent can be injected at other locations beyond the feed zone, including into the secondary extruder.

Following injection of the blowing agent, the components are continuously mixed in the primary extruder 13. The exit pressure of the primary extruder 13 of the exemplary embodiment is generally in the range of from about 1500 to about 4000 psi. The temperature of the primary extruder 13 of the exemplary embodiment is generally in the range of from about 390 to about 475° F. The mixture is subsequently passed, at a high enough pressure that the blowing agent remains in solution, through a hollow adapter section 17 into a cooled secondary tandem extruder 19. The molten mixture is passed along the length of the cooled secondary extruder at low shear where cooling and additional homogenization occur. The exit pressure of the secondary extruder 19 of the exemplary embodiment is generally in the range of from about 400 to about 2500 psi. The temperature of the extrudate from the secondary extruder 19 of the exemplary embodiment is generally in the range of from about 220 to about 320° F. In general, the temperature of the primary extruder should be sufficient to melt the polymer and any organic additives, and to promote efficient mixing and dissolution. The temperature and pressure in the secondary extruder should be sufficient to maintain a homogeneous solution of the components in the melt state. It is understood that the temperatures, pressures and other conditions described can vary depending on the properties of the thermoplastic polymer and blowing agent used in the process, and further that a third extruder in-tandem with the secondary extruder can be deployed to provide additional cooling. The specific conditions to be used are apparent to a person of skill in the art.

As seen in FIG. 1, for making foam sheet, the melt is then expressed through an annular die 21 and is allowed to undergo expansion under the ambient conditions of atmospheric pressure and room temperature in the form of an elongated bubble or tube 23, and the foamed polymer is drawn over a cylindrical surface of a cooling and sizing drum 25, and slit to form sheet stock 27, which is taken up on one or more winding reels 29. To further augment the mechanical, aesthetic, and other characteristics of the foam, the sheet thus made can be laminated with a film of solid, unfoamed polymer, where the polymer comprising the film can be the same polymer as that comprising the foam or a different polymer. The film can be applied by melt extruding the film-forming polymer or by heat-welding the film onto the sheet. The film can be applied on one or both surfaces, and can be applied either on-line to the sheet stock 27 before it is wound up as rolls 29 or by taking the roll 29 and applying the film in a separate process. The thickness of the film is generally from 1 to 25% of the thickness of the foam sheet, depending on the properties desired in the final product. The film can be comprised of a single layer or multiple layers and can contain nanoparticles such as, for example, nanoclays to further augment the aesthetics, mechanical properties, and gas-barrier properties of the film/foam structure. Such film/foam composite structures are different than the integral skin foam structures where a density gradient exists across the cross-section of the sheet and where the surface layers of the foam sheet have cellular structure, but a density different than that of foam in the core portion of the sheet.

Alternatively, as shown in FIG. 2, for making expandable polymeric beads, the melt is expressed through a strand or rod die 28 into a low temperature zone 30 containing a heat transfer fluid 32 such as water. In this manner, the molten solution solidifies into strands, usually about 0.05 inch in diameter, without undergoing any expansion or foaming. The continuous strands then go through chopper 34 or any other cutting apparatus, and are cut into pellets (typically 0.05 inch×0.05 inch) to form the so-called expandable beads 36. It should be noted that a die other than a strand or rod die can be used to make expandable formulations in shapes other than beads.

EXAMPLES

Various blend compositions were prepared and tested with the compositions prepared and results of the testing set forth in FIGS. 3-7. For the purpose of comparison, a polystyrene control sample was prepared from a commercially available crystal polystyrene resin with a MI of about 1.5 g/10 min (200° C./5 kg). The blend samples were prepared from the commercially available polystyrene resin blended with a PLA that is NatureWorks 2002D resin with a MI of 5-7 g/10 min (210° C./2.16 kg).

The testing blend compositions included polystyrene (PS) as the alkenyl aromatic polymer component, and polylactic acid (PLA) as the biodegradable or bio-based polymer component.

The bio-based or biodegradable polymers used in the blend composition can be any suitable bio-based or biodegradable polymers. One exemplary type of polymers are bio-based or biodegradable polymers with narrow molecular weight distributions, having linear structure and a melt index of from about 0.1 to about 20 (210° C./2.16 kg). A linear, narrow molecular weight distribution bio-based or biodegradable polymer is described in detail in the Foam Extrusion and Thermoforming presentation given by Jim Nangeroni, Ph.D., referenced above and incorporated herein in its entirety.

For the purposes of testing, the bio-based or biodegradable polymer resin selected was the NatureWorks 2002D resin, which is a polylactic acid resin having a narrow molecular weight distribution, and a melt index of 5-7 g/10 min.

Example A

Eighteen blends were prepared according to the formulations illustrated in FIG. 3. The blends were compounded on a 34 mm Leistritz twin screw extruder. The PLA was dried in a Maguire Vacuum drier at 120° F. for 20 minutes. After drying, the PLA was dry blended with the PS and blend compatibilizer or compatibilizers in a batch mixer and then introduced to the line. The temperature profile on the extruder ranged from 360° F. to 375° F. The extruder was set to operate at screw speed of 8 rpm and at a throughput of 40 lb/hr.

The PS-PLA compounded blends were foamed on a lab scale Gloenco tandem-extruder. The compounded samples were typically dried in a Maguire low pressure dryer for 20 min at 120° F. before starting the runs. About 1% talc nucleating agent in a PS masterbatch (50% talc and 50% PS) was mixed with the sample prior to feeding to the extruder. The melt temperature was set at 145° C. and then adjusted accordingly to yield the best foaming for a given sample. The amount of blowing agent (iso-pentane) generally varied from 4% to 8%.

FIG. 3 is a table indicating the composition breakdown of the various samples prepared for testing. NAS 30 is a styrene-methyl methacrylate (SMMA) copolymer from Ineos-Nova having a melt index of 2.2 g/10 min (200° C./5 kg), NAS21 is a SMMA copolymer from Ineos-Nova with a melt index of 1.9 g/10 min (200° C./5 kg), Zylar 631 is an impact modified SMMA copolymer from Ineos-Nova with a melt index of 5 g/10 min (200° C./5 kg), FG1901X is a maleated styrene-ethylene-butylene-styrene (SEBS) block copolymer from Kraton Polymers with 30 wt % styrene, a melt index of 22 g/10 min (230° C./5 kg), and 1.4-2.0 percent by weight of maleic anhydride.

Sheet samples 1 to 18 were prepared having composition varying from about 43% to about 65% polystyrene, about 35% to about 50% polylactic acid, and from about 1% to about 10% blend compatibilizer. The exception to this is sample 4 which had no compatibilizer, and testing showed to have low tear resistance properties. It was desired to prepare a bio-based or partially degradable foamable blend composition that exhibited excellent physical properties such as an open cell content of 0 to 50 percent, density of less than about 0.16 g/cm$^3$, a modulus in the machine direction and transverse direction of greater than 10,000 psi, and an expansion ratio of greater than about 10 times.

Samples of 19 and 20 were prepared by mixing the blend components in a batch mixer and were not compounded on the 34 mm Leistritz twin screw extruder. Sample 19 contained 50% PLA, 45% PS, 5% FG1901X compatibilizer and talc was added at 1% of the mixture. Sample 20 contained 50% PLA, 45% PS, 5% FG1901X compatibilizer and talc was added at 2% of the mixture. Both samples 19 and 20 yielded low density foam, 0.0992 and 0.1064 g/cm3, respectively, with good properties as shown in FIG. 4. In particular, samples 19 and 20 achieved a flexural modulus in the machine direction of 14,574 and 16,964 psi, respectively. The flexural modulus in the transverse direction for samples 19 and 20 was 19,760 and 24,601 psi, respectively.

An AccuPyc 1330 pyncometer was used to measure open cell percentages of the samples. Flexural modulus of the samples was measured according to ASTM D790.

Example B

A pilot scale tandem extrusion system was used to foam the formulations detailed in FIG. 5. These samples were prepared having 40%-44% polystyrene, 51% 55% polylactic acid, and 5% blend compatibilizer. Kraton FG1901X was used as the blend compatibilizer for all of these samples. A mixture of iso-pentane and $CO_2$ was used in the foam trials. The blowing agent levels of about 3% to about 4% by weight, secondary extruder RPM of about 14 to about 19, melt temperature of about 286° F. to about 291° F. and output of about 138 to about 160 lb/hr are summarized in FIG. 6.

As summarized in FIG. 5 the testing results for the three samples prepared indicated densities of approximately 0.10-0.11 g/cm3 for the three samples. Sample 21 had 20.1% open cell content, a basis weight of 7.0 g/100 in$^2$, and a gauge of 0.039 inches. Sample 22 had 51.2% open cell content, a basis weight of 7.8 g/100 in$^2$ and a gauge of 0.045 inches. Sample 23 had 66.0% open cell content, a basis weight of 8.0 g/100 in$^2$, and a gauge of 0.047 inches.

Example C

A series of samples were prepared and tested in which the samples included two blend compatibilizers. The blend compatibilizers used in the samples were Dylark 232, a styrene-maleic anhydride (SMA) copolymer from Nova Chemicals, Kraton FG1901X, a maleated SEBS from Kraton Polymers, Kraton G1652M, another SEBS copolymer from Kraton Polymers and Plexiglas 684, a styrene-methyl methacrylate (SMMA) copolymer from Arkema.

As shown by the testing data in FIG. 7, the samples compatibilized with dual blend compatibilizers generally had lower open cell contents as compared to those with only a single blend compatibilizer, shown in FIG. 5.

While the present invention has been described with reference to one or more particular embodiments, those skilled in the art will recognize that many changes can be made thereto without departing from the spirit and scope of the present invention. Each of these embodiments and obvious variations thereof is contemplated as falling within the spirit and scope of the claimed invention, which is set forth in the following claims.

What is claimed is:

1. A bio-based or partially biodegradable thermoplastic foam structure comprising a blend, said blend comprising:
   at least one alkenyl aromatic polymer in the amount between about 10 to 90 percent by weight of the blend;
   at least one bio-based or biodegradable polymer selected from polylactic acid and copolymers thereof or polyglycolic acid and copolymers thereof in the amount between about 10 to 90 percent by weight of the blend; and
   at least two blend compatibilizers comprising a first blend compatibilizer selected from the group consisting of styrene-ethylene-butene-styrene and maleated styrene-ethylene-butene-styrene and a second blend compatibilizer selected from the group consisting of styrene-maleic anhydride copolymer and styrene-methyl methacrylate copolymer,
   wherein the foam structure comprises at least about 1 percent by weight of the first blend compatibilizer and at least about 2 percent by weight of the second blend compatibilizer, and up to about 10 weight percent of the at least two blend compatibilizers collectively, and further wherein the foam structure is a thermoformable sheet having expansion ratio greater than 7.

2. The foam structure of claim 1, comprising between about 45 to 80 weight percent of the at least one alkenyl aromatic polymer.

3. The foam structure of claim 1, wherein the foam structure has an expansion ratio between about 7 to about 70.

4. The foam structure of claim 3, comprising between about 20 to 55 weight percent of the at least one bio-based or biodegradable polymer.

5. The foam structure of claim 1, wherein the foam structure has a flexural modulus of greater than about 15,000 psi.

6. The foam structure of claim 1, wherein the at least one alkenyl aromatic polymer is selected from the group consisting of: polystyrene, substituted polystyrene and copolymers thereof, and high-impact polystyrene and copolymers thereof.

7. The foam structure of claim 1, wherein the foam structure has an expansion ratio of about 10.

8. The foam structure of claim 1, wherein said foam has an open cell content of from about 1 to about 30 percent.

9. The foam structure of claim 1, wherein the first blend compatibilizer is maleated styrene-ethylene-butene-styrene and the second blend compatibilizer is styrene-maleic anhydride.

10. The foam structure of claim 1, comprising approximately 46 percent by weight of the at least one alkenyl aromatic polymer, approximately 51 percent by weight of the at least one bio-based or biodegradable polymer, approximately 1 percent by weight of the first blend compatibilizer, and approximately 2 percent by weight of the second blend compatibilizer, wherein the at least one alkenyl aromatic polymer is polystyrene and the at least one bio-based or biodegradable polymer is polylactic acid.

11. A bio-based or partially biodegradable thermoplastic foam structure comprising a blend, said blend comprising:
at least one alkenyl aromatic polymer in the amount between about 10 to 90 percent by weight of the blend;
at least one bio-based or biodegradable polymer selected from polylactic acid and copolymers thereof or polyglycolic acid and copolymers thereof in the amount between about 10 to 90 percent by weight of the blend; and
at least two blend compatibilizers, comprising a first blend compatibilizer selected from the group consisting of styrene-ethylene-butene-styrene and maleated styrene-ethylene-butene-styrene and a second blend compatibilizer selected from the group consisting of styrene-maleic anhydride copolymer and styrene-methyl methacrylate copolymer,
wherein the foam structure comprises between about 1 at least about 1 percent by weight of the first blend compatibilizer and at least about 2 percent by weight of the second blend compatibilizer, and up to about 10 weight percent of the at least two blend compatibilizers collectively, and further wherein the foam structure is a thermoformable article, and has an expansion ratio between about 9 to about 12.

12. The foam structure of claim 11, comprising between about 10 to 90 weight percent of the at least one alkenyl aromatic polymer, and between about 10 to 90 weight percent of the bio-based or biodegradable polymer, wherein the at least one alkenyl aromatic polymer is polystyrene and the at least one bio-based or biodegradable polymer is polylactic acid.

13. The foam structure of claim 11, wherein the foam structure has an expansion ratio of about 10.

14. The foam structure of claim 11, wherein said foam structure has an open cell content of from about 1 to about 30 percent.

15. The foam structure of claim 12, comprising approximately 46 percent by weight polystyrene, approximately 51 percent by weight polylactic acid, approximately 1 percent by weight of the first blend compatibilizer, and approximately 2 percent by weight of the second blend compatibilizer.

16. A bio-based or partially biodegradable thermoplastic foam structure, comprising a blend, said blend comprising:
polystyrene in the amount between about 10 to 90 percent by weight of the blend;
polylactic acid in the amount between about 10 to 90 percent by weight of the blend;
styrene-maleic anhydride; and
maleated styrene-ethylene-butene-styrene,
wherein the foam structure comprises at least about 1 percent by weight of maleated styrene-ethylene-butene-styrene and at least about 2 percent by weight of styrene-maleic anhydride, and up to about 10 weight percent of styrene-maleic anhydride and maleated styrene-ethylene-butene-styrene collectively, and further wherein the foam structure is a thermoformable sheet having an expansion ratio greater than 7 and an open cell content of from about 1 to about 60 percent.

17. The foam structure of claim 11, wherein the foam structure is a sheet with a flexural modulus of greater than about 15,000 psi.

18. The foam structure of claim 16, wherein the foam structure is a sheet with a flexural modulus of greater than about 15,000 psi.

* * * * *